April 25, 1967 W. D. ALEXANDER 3,315,458
METHOD FOR SPLICING MULTI-PLY TWISTED CORDS
Filed Sept. 10, 1963 2 Sheets-Sheet 1
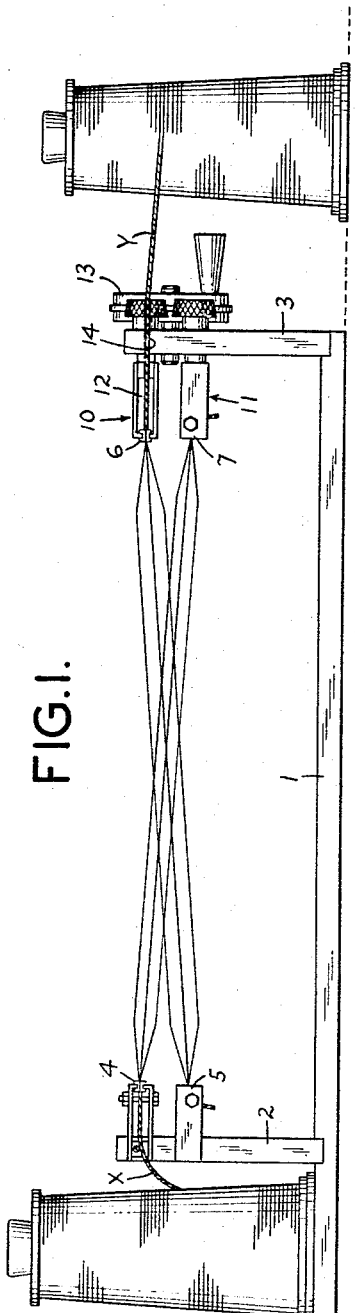
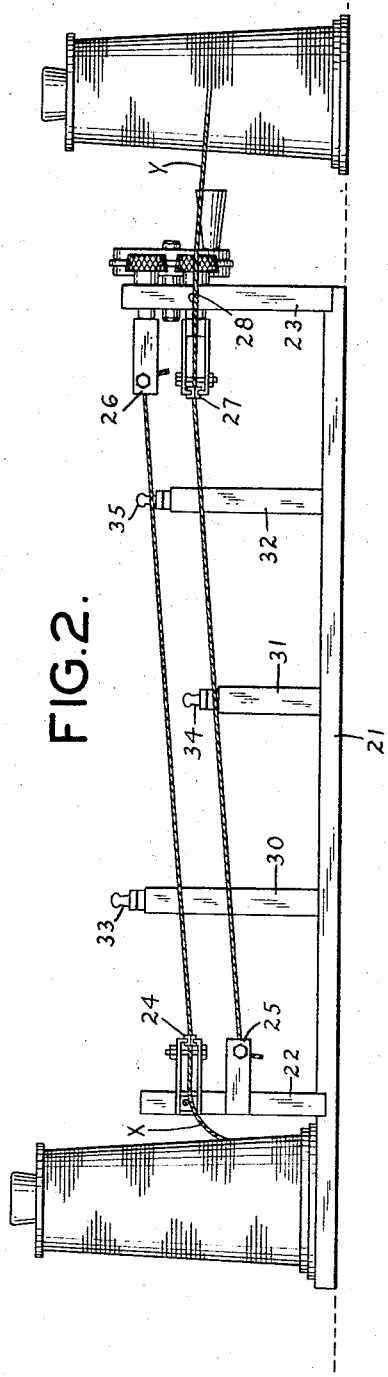
INVENTOR
WAYNE D. ALEXANDER
BY
Robert A. Harman
ATTORNEY April 25, 1967   W. D. ALEXANDER   3,315,458
METHOD FOR SPLICING MULTI-PLY TWISTED CORDS
Filed Sept. 10, 1963   2 Sheets-Sheet 2

INVENTOR
WAYNE D. ALEXANDER
BY
Robert A. Harman
ATTORNEY 3,315,458
METHOD FOR SPLICING MULTI-PLY
TWISTED CORDS
Wayne D. Alexander, Chester, Va., assignor to Allied Chemical Corporation, New York, N.Y., a corporation of New York
Filed Sept. 10, 1963, Ser. No. 307,891
4 Claims. (Cl. 57—159)

This invention relates to the joining of multi-ply twisted cord or like structures; i.e. cords or the like composed of two or more yarns or strands, and more particularly to a splicing method and apparatus, and to spliced multi-ply twisted cords of improved uniformity.

In textile and industrial applications of fiber structures consisting of at least two distinct individual strands or yarns twisted together, and especially plied or cabled structures, e.g. cords, it is generally found undesirable to have knots or other protuberances such as usually result from splicing lengths of cord or like structure. Not only do such protuberances cause snagging of the cord through handling means such as guides and needles, but such protuberances contribute to defects in appearance and in utility. Splices formed by use of adhesives may be made relatively non-bulky, but are generally weak unless the individual yarn ends to be joined are extensively overlapped, in which case the thickness of a twisted cord throughout the region of splice is approximately doubled.

In cords intended for industrial application such as reinforcement of tires or conveyor belts, and other applications wherein cord strength and uniformity are critical, it is essential that variations of cord thickness or denier, strength, and twist be maintained small throughout. In a rubber tire reinforced with spliced cord of two ply construction or greater, for example, any sizable variation in the cord twist in the region of splice will produce resultant torque upon the reinforced structure and constitute a source of potential tire failure.

It is an object of this invention to provide improved spliced multi-ply twisted cords and like twisted or cabled structures. It is another object of this invention to provide a method for uniting multi-ply twisted cords without appreciably affecting the denier, strength, twist, or bulk of the cord in the region of the splice. It is a still further object of this invention to provide novel apparatus for the splicing of multi-ply twisted cords in such fashion as to regain the original cord twist within the region of splice after splicing. Other objects and advantages will become apparent hereinafter. Wherever "cords" are referred to herein it is to be understood that like twisted structures, and also cabled structures, are broadly included in the scope of this term.

The splicing method of this invention consists essentially of the following steps: gripping at two spaced locations each of two like cords which are to be spliced, viz. at a terminal gripping location toward the end of the cord and at an interior gripping location toward the main length of the cord, thus defining a gripped segment of each cord, along which uncontrolled torsional and longitudinal cord movement is prevented, the two gripped segments being made approximately equal in length; aligning said gripped segments with the terminal gripping location of each cord aligned with the interior gripping location of the other cord; removing the twist from the gripped segment of one cord by rotating said first gripped segment together with the terminal gripping location; removing the twist from the gripped segment of the second cord by rotating said second gripped segment together with the interior gripping location thereof thus building up and storing in the main length of said second cord the same amount of twist as is removed from the gripped segment thereof; separating the individual yarns or strands composing the gripped segments; uniting each yarn of said first segment to a yarn of said second segment at non-overlapping sites to form a region of splice; said sites where union is made being so chosen that the yarn length for each united pair of yarns, from one interior gripping location to the site of union and onto the other interior gripping location is equal for all the united pairs of yarns; freeing the yarn ends for movement about the cords; and then giving the gripping location of the second cord the same number of turns of rotation as previously but in the opposite sense, thereby restoring the original amount of twist in the region of splice and in the main length of the second cord. Preferably this last step is accomplished by positively rotating the gripping location of the second cord to remove the stored twist from the main length and impart it to the region of splice between the two interior gripping locations of the two cords which have been spliced.

Uniting of the individual yarns may be effected by methods such as application of adhesives, knotting, sewing, fusing, or analogous means; and the uniting may be effected by hand or mechanically. Methods involving adhesives, sewing, or fusing, require some overlapping of the paired yarns. Preferably the yarns will overlap by about ¼ inch to 3 inches. The sites at which the various pairs of yarn are united will be staggered along the region of splice to avoid overlapping of any two such sites. It is important that these various sites of union be so chosen that the united yarn from one interior gripping location to the site of union and on to the other interior gripping location will be equal for all yarn pairs. Otherwise, the spliced cord would contain slack or looped yarn in the region of splice. Normally this required equal length will be the length of the two equally long gripped segments of the cords being joined, less the length of overlap between the paired yarns.

The ends of the yarns are conveniently freed for rotation after the uniting of the yarn pairs, by cutting, melting, burning, or like severing operation. This severance will usually be made as close as possible to the site of union of the yarns so as to avoid as far as possible protruding ends. The severing operation can also be effected before the uniting operation by use of auxiliary clamping means which hold the paired yarns in position to be united. Severing prior to uniting allows overlapping and uniting the full length of the severed ends, thereby entirely avoiding protruding ends in the spliced cord.

The splicing method of this invention is capable of rapid manual or automatic execution and is eminently suited for use in commercial operations of cord production or utilization. The gripping means for preventing uncontrolled cord movement suitably takes the form of spring or screw operated clamps, or hooks or posts or compact coil springs about which the cords are looped or tied or fastened. The terminal gripping means for one cord and the internal gripping means for the second cord are mounted on, or are part of suitable rotatable supports, whereby the corresponding gripping locations of these cords can be rotated. The length of the gripped segments is for example from about 4 to 20 inches depending on cord diameter and twist.

These gripped segments can be aligned close together throughout their length or can intersect preferably at an acute angle. The segments should lie fairly close so that they are separated by not more than about 5 inches throughout the region of splice.

The order in which the two segments are untwisted is immaterial, it being preferred however, for speed of operation, that both segments be untwisted simultaneously. Novel apparatus is provided by this invention to achieve such improvement. Once the cords are untwisted, the individual yarns thereof may be separated by hand or mechanically.

The spliced cords of this invention are characterized by having throughout, including the region of the splice, the same twist; and by having in the region of splice no greater denier than about $d(1+1/n)$ where $d$ is the denier of the main length of the cord and $n$ is the number of individual yarns or strands composing the cord. Thus, a two ply cord will have denier in the region of the splice of not more than about 50% greater than that of the main cord; a three ply cord will have denier of not more than about 35% greater than the main cord. The strength of the splice in our cords will be at least about 75% of the strength of the unspliced cord, as determined by tensile strength tests of spliced and unspliced cord portions. The flexibility or suppleness of the cord is essentially unaltered in the region of the splice contrary to previous splicing techniques using adhesives, which result in a stiffening of the strand throughout the entire region of the splice. Spliced cords of this invention perform satisfactorily in conventional cord handling or processing operations, and lead to the production of improved end products fabricated therefrom.

The invention will be more fully explained in conjunction with the drawings wherein:

FIGURE 1 is an elevation illustrating a preferred embodiment of the apparatus of this invention.

FIGURE 2 is an elevation illustrating another embodiment of the apparatus of this invention.

Figure 3:
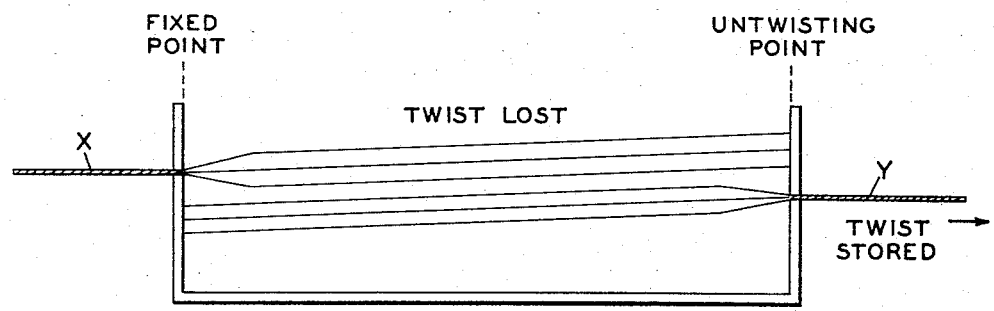
FIGURE 3 is a schematic diagram illustrating the process features of this invention.
Figure 4:
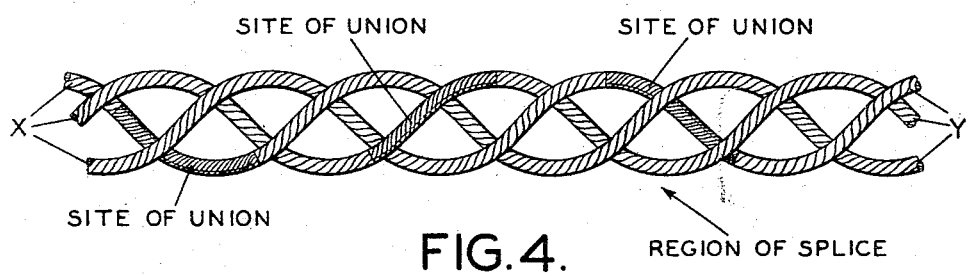
FIGURE 4 is an illustration of the spliced cord of this invention, shown as being expanded for greater clarity.

Referring now to the drawings, the apparatus of FIGURE 1 comprises a base 1 which rigidly supports arms 2 and 3 perpendicular to the base; fixed gripping means or clamps 4 and 5 supported on arm 2; rotatable clamps 6 and 7 supported on arm 3, each being opposite one of the fixed clamps 4 and 5, and being carried for rotation on rotatable spindles 10 and 11 respectively; passage 12 axially through rotatable spindle 10 to facilitate transmittal of twist between the interior gripping location established at 6 and the main length of the cord Y; and coupling wheel 13 adapted e.g. by gearing to cause both rotatable spindles to be simultaneously driven an equal number of turns in the same sense.

The passage 12 should be approximately axially through the rotatable spindle 10 to position the cord fairly close to its axis of rotation. It is convenient to provide the passage with a longitudinal slot 14 so that the cord can be removed laterally from the passage. Alternatively the rotatable support mechanism can be in the form of a large collet-like member through which cord can pass without interference during a continuous cord handling operation.

Various coupling means can be employed in the apparatus of this invention to secure equal and simultaneous rotation of the rotatable clamps. Such suitable coupling means include intermeshed gear teeth or interacting resilient surfaces on the periphery of each rotatable support; non-slipping flexible belt encompassing frictionally contacted whorls or the like to drive said rotatable supports; magnetic couplings; electrical couplings via selsyn motors; and other means analogous thereto. The power transmitting means which supplies the rotational force to the rotatable spindles may comprise: a handle device such as shown in FIGURE 1 for manual operation; knurled outer peripheries of the rotatable support for manual operations; axially positioned shafts or depressed keyways for reception of a shaft for the transmission of rotational power from a motor or other source; radially extending vanes to transmit pneumatic power; magnetic couplings; and other analogous means.

In operation, a first cord X is gripped near one end by rotatable clamp 7, and is gripped at an interior location by fixed clamp 4 to make an acute angle between the gripped segment thus formed and the base of the apparatus.

A second cord Y is gripped near one end by fixed clamp 5 and is gripped at an interior location by rotatable clamp 6 making the length of the gripped segment of cord Y approximately equal to that for cord X and aligning the gripped segments close together over a region of intersection midway between the supporting arms 2 and 3, with their ends pointing in opposite directions.

Coupling wheel 13 is then rotated until both gripped segments become untwisted. The individual yarns of each cord are separated and each separated yarn of one cord is then paired with a like yarn of the other cord, at staggered sites along the region of intersection of the gripped segments. The yarn lengths from one interior gripping location to the site of union of the yarn pair and on to the other interior gripping locations are equalized for all yarn pairs, and the yarn pairs are united.

The yarn lengths from the site of union to the end of the yarn are then severed as close as possible to the site of union. The coupling wheel is now rotated in the sense opposite to its previous rotation and the same number of turns. Thereby the excess twist stored in cord Y interiorly of the gripping location at clamp 6 is removed and an equal twist is imparted to the region of splice between clamps 6 and 4.

The spliced cord is then unclamped at 4 and at 6 and is taken out of passage 12 through slot 14 in spindle 10.

FIGURE 2 illustrates a preferred apparatus for practicing this invention, comprising frame 21 and perpendicular arms 22 and 23 similar to the corresponding members of FIGURE 1. This apparatus also includes fixed clamps 24 and 25 supported on arm 22 one above the other and rotatable clamps 26 and 27 supported opposite to the fixed clamps on arm 23, generally as in the apparatus of FIGURE 1. In FIGURE 2, three clamping posts are provided spaced along base 21 namely posts 30, 31 and 32 bearing clamps 33, 34 and 35 respectively. The number of posts will be made equal to the number of yarns or strands composing the cords to be spliced.

The operation of the apparatus of FIGURE 2 is generally similar to that of FIGURE 1. In FIGURE 2 an upper cord X is illustrated strung up between clamp 24 at the interior of the cord and rotatable clamp 26 near the end of the cord. A lower cord Y running in the opposite direction to cord X is illustrated, strung up between fixed clamp 25 near the end thereof and rotatable clamp 27 at the interior thereof. The rotatable clamps 26 and 27 of FIGURE 2 are coupled for equal rotation in the same sense, as are the clamps of FIGURE 1. A longitudinal slot 28 in the spindle bearing clamp 27 allows removing the cord from the apparatus.

In operation, as for the apparatus of FIGURE 1, the rotatable spindles are turned until the twist has been removed from the segment of cord X between clamps 24 and 26 and also form the segment of cord Y between clamps 25 and 27.

One of the individual yarns of cord Y is then separated out just beyond post 30 and a yarn of cord X is also separated near post 30. These two yarns are clamped together at clamp 33; and the end of each is then severed at a point beyond the clamp. Adhesive is applied to the resulting free ends, clamp 33 is unfastened and the ends are rolled together with the fingers to form a joint. Alternatively, the clamp can be unfastened first; and as a second alternative the ends can be stitched side by side with a hand zig-zag stitcher. The remaining two yarns of each of the cords are similarly paired in the vicinity of posts 31 and 32 respectively, the pairs clamped at 34 and 35 respectively, and the yarn pairs united. The rotation of rotatable clamps 26 and 27 is then reversed as compared to the previous untwisting operation, whereby the original twist is restored to the segment of the spliced cord between clamp 24 and clamp 27. The finished spliced cord is unclamped from clamp 24 and is removed, through slot 28, from the apparatus.

It will be appreciated that clamps 33, 34 and 35 should be set at heights such that the yarn paths from clamp 24 to clamp 27 via each of the clamps 33, 34 and 35 will all be equal. With the string up shown in FIGURE 2 where yarn cord X is an upper cord and cord Y is a lower cord, a suitable arrangement will be to make clamp 33 the highest clamp above the line of the upper cord, clamp 34 the lowest clamp about at the line of the lower cord, and clamp 35 at an intermediate height about at the line of the upper cord as illustrated in FIGURE 2. Alternatively, the cords could be strung up to intersect as in FIGURE 1 and each of clamps 33, 34 and 35 could be at an intersection of a yarn of one cord with a yarn of the other cord. The arrangement shown in FIGURE 2 is particularly convenient to allow easy handling of the individual yarns and arrangement thereof in pairs which can conveniently be joined.

The spliced cord produced using the apparatus of FIGURE 2 can readily be made free of protruding ends whereby the splice will have a minimum adverse effect on the handling characteristics of the cord. The splice will have excellent strength, at least 75% of the tensile breaking strength of the unspliced cord; will have the same twist in the region of splice as in the unspliced lengths; will have denier no more than about (100/$n$) percent greater than that of the unspliced cord lengths, $n$ being the number of yarns or plies composing the cord. The flexibility of the cord in the region of splice will be essentially the same as that in the unspliced lengths.

The following examples describe specific embodiments of the invention but are not intended to be considered as limitative of the scope of the invention.

*Example 1*

The apparatus of FIGURE 2 was employed in the splicing of a three ply cord consisting of 6720 denier 1088 filament 5.0 Z-twist polycaproamide yarns, said cord having 5.0 turns per inch S-twist. The segments of cord between the fixed clamps and the rotating clamps were 20 inches long, and mounted three inches apart, one above the other. The clamping posts along the base (30, 31, and 32 of FIGURE 2) were at 5-inch intervals. Spring clamps ¾ inch wide were mounted thereon. The heights of the several clamps above the base were as follows.

| Clamp No.: | No. of inches |
|---|---|
| 24 | 5 |
| 25 | 3¼ |
| 26 | 6½ |
| 27 | 4¾ |
| 33 | 6½ |
| 34 | 3¾ |
| 35 | 5½ |

The operation was as above described in connection with FIGURE 2. The segments were simultaneously untwisted by the simultaneous rotation of the rotatable clamps. The three yarns composing each cord were separated and paired with those of the other cord, and each pair was clamped at one of the clamps 33, 34, 35. The yarn ends were cut off to within about ½ inch of the site of clamping. An adhesive composition of 12% polycaproamide (20,000 molecular weight, by viscosity measurement) dissolved in 2,2,3,3-tetrafluoropropanol was then applied manually to each of the six severed ends and, with a slight manual rolling of the severed end with the adjacent yarn, uniting was effected.

The paired, united yarns were then unclamped and, by rotating the rotatable clamp 27 in the reverse sense from its original rotation, an amount of twist was returned to the region of splice equal to the amount originally removed from the gripped segment of cord Y and stored in the main length of cord Y. The cord was then unfastened from the stationary clamp and from the rotatable clamp on the opposite end of the apparatus through the longitudinal slot 28.

The splice thereby obtained was found to have 86% of the breaking strength of the cord, and had a measured increase in denier of 27%.

*Example 2*

The apparatus of FIGURE 1 was employed in the splicing of a two ply cord consisting of 6720 denier 1088 filament 5.0 Z-twist polyethylene terephthalate yarns, said cord structure having 5.0 turns per inch S-twist. Two twenty inch cord segments were mounted between the fixed and the rotatable clamps, parallel and three inches apart, with their ends at opposite ends of the apparatus.

The operation was essentially as described in connection with FIGURE 1. The cords were simultaneously untwisted by simultaneously rotating, in the same sense and the same number of turns, the coupled spindles 10 and 11. The individual yarns were paired and were sewn over a 1¾ inch overlapping length employing a Pfaff Model 259 portable zig-zag stitcher manufactured by the Pfaff International Corp., New York. A distance of three inches separated the two sites of union. The stored twist was then returned to the region of the splice by rotation of the spindles back to their starting point. The splice thereby obtained was found to have 77% of the breaking strength of the unspliced cord and had a measured increase in denier of about 37% over the region of the splice extending from the beginning of one site of union to the end of the second site of union.

I claim:

1. Method for splicing multi-ply twisted cords and like twisted and cabled structures, consisting essentially of the following steps: gripping at two spaced locations each of two like cords which are to be spliced at a terminal gripping location toward the end of the cord and at an interior gripping location toward the main length of the cord, thus defining a gripped segment of each cord, along which uncontrolled torsional and longitudinal cord movement is prevented; the two gripped segments being made approximately equal in length; aligning said gripped segments with the terminal gripping location of each cord aligned with the interior gripping location of the other cord; removing the twist from the gripped segment of one cord by rotating said first gripped segment together with its terminal gripping location; removing the twist from the gripped segment of the second cord by rotating said second gripped segment together with the interior gripping location thereof thus building up and storing in the main length of said second cord the same amount of twist as is removed from the gripped segment thereof; separating the individual yarns or strands composing the gripped segments; uniting each yarn of said first segment to a yarn of said second segment at non-overlapping sites to form a region of splice; said sites where union is made being so chosen that the yarn length for each united pair of yarns, from one interior gripping location to the site of union and on to the other interior gripping location is the same for all the united pairs of yarns; and after freeing the yarn ends for movement about the cords, giving the gripping location of the second cord the same number of turns of rotation as previously but in the opposite sense, thereby restoring the original amount of twist in the region of splice and in the main length of the second cord.

2. Method of claim 1 wherein each yarn of each yarn pair to be united is clamped with its end severed at a point beyond the clamp, at clamping positions each of which defines a yarn path of the same length, going from one of the interior gripping locations to the particular clamping position and on to the other interior gripping location; and wherein each yarn end is united with the other yarn of the pair so that no protruding end is formed in the splice.

3. Method of claim 1 wherein each yarn end of a pair is united with the other yarn of the pair by use of an adhesive composition of polycaproamide dissolved in 2,2,3,3,-tetrafluoropropanol.

4. Method of claim 1 wherein each yarn end of a pair is united with the other yarn of the pair by sewing over an overlapping length.

References Cited by the Examiner
UNITED STATES PATENTS

| | | | |
|---|---|---|---|
| Re. 11,296 | 12/1892 | Macintosh | 57—22 |
| 1,396,618 | 11/1921 | Bennett | 57—22 |
| 1,503,688 | 8/1924 | Pearson et al. | 57—22 |
| 1,523,878 | 1/1925 | Kelly | 57—22 |
| 1,572,655 | 2/1926 | Pearson et al. | 57—22 |
| 1,675,400 | 7/1928 | Young | 57—159 X |
| 2,605,603 | 8/1952 | Willis | 57—142 |
| 3,012,398 | 12/1961 | Merkle | 57—159 |

MERVIN STEIN, *Primary Examiner.*